United States Patent
Hess et al.

(12)
(10) Patent No.: US 6,217,839 B1
(45) Date of Patent: Apr. 17, 2001

(54) REMOVAL OF SULFUR COMPOUNDS FROM GASEOUS WASTE STREAMS

(75) Inventors: Mark E. Hess, Palatine; Luigi Laricchia, Arlington Heights, both of IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/377,409

(22) Filed: Aug. 20, 1999

(51) Int. Cl.$^7$ .................................................. B01D 53/48
(52) U.S. Cl. .............................. 423/243.01; 423/243.06; 423/243.08; 423/220; 423/234
(58) Field of Search ....................... 423/220, 225, 423/234, 243.01, 243.06, 243.08, 244.09, 244.1

(56) References Cited

U.S. PATENT DOCUMENTS

| | | | |
|---|---|---|---|
| 2,878,099 | * 3/1959 | Breuing et al. | 423/234 |
| 2,988,500 | * 6/1961 | Gleim et al. | 208/206 |
| 3,914,387 | 10/1975 | von Jordan et al. | 423/242 |
| 3,920,794 | 11/1975 | La Mantia et al. | 423/242 |
| 4,125,597 | * 11/1978 | Fleck | 423/573 R |
| 4,156,712 | 5/1979 | Kanai et al. | 423/242 |
| 4,248,842 | * 2/1981 | Kaupisch et al. | 423/242 |
| 4,307,069 | 12/1981 | Lurie | 423/242 |
| 4,452,766 | 6/1984 | Pike | 423/242 |
| 6,063,352 | * 5/2000 | Risse et al. | 423/243.06 |

FOREIGN PATENT DOCUMENTS

| | | | |
|---|---|---|---|
| 54-25271 | * 2/1979 | (JP) | 423/243.08 |
| 54-72770 | * 6/1979 | (JP) | 423/243.08 |
| 56-7633 | * 1/1981 | (JP) | 423/243.08 |
| WO 94/05400 | * 3/1994 | (WO) | 423/243.08 |

OTHER PUBLICATIONS

Dr. Karl Baur "Methods of Regeneration of Waste Liquor From Olefin Plants" Linde Reports on Science & Technology, 25, pp. 46–49.*

* cited by examiner

*Primary Examiner*—Steven P. Griffin
*Assistant Examiner*—Timothy C Vanoy
(74) *Attorney, Agent, or Firm*—John G. Tolomei; Frank S. Molinaro; Benjamin C. Spehlmann

(57) ABSTRACT

Sulfur dioxide and other sulfur compounds are removed from various waste gas streams including those from incineration, refinery sulfur processing, coal burning, or metal smelting operations. The process for sulfur compound removal comprises, in an adsorption vessel, the quenching and subsequent adsorption of the gas with a suitable adsorbent such as an aqueous basic solution (e.g. sodium hydroxide). Sulfur compounds are thus adsorbed into a liquid scrubbing solution predominantly in the form of partially oxidized species (i.e. sulfites, bisulfites, thiosulfites, sulfides, and bisulfides). In a separate heterogeneous catalytic oxidation step, these partially oxidized sulfur compounds are more completely oxidized so that the chemical oxygen demand of the effluent from the oxidation reactor is substantially reduced.

28 Claims, 1 Drawing Sheet

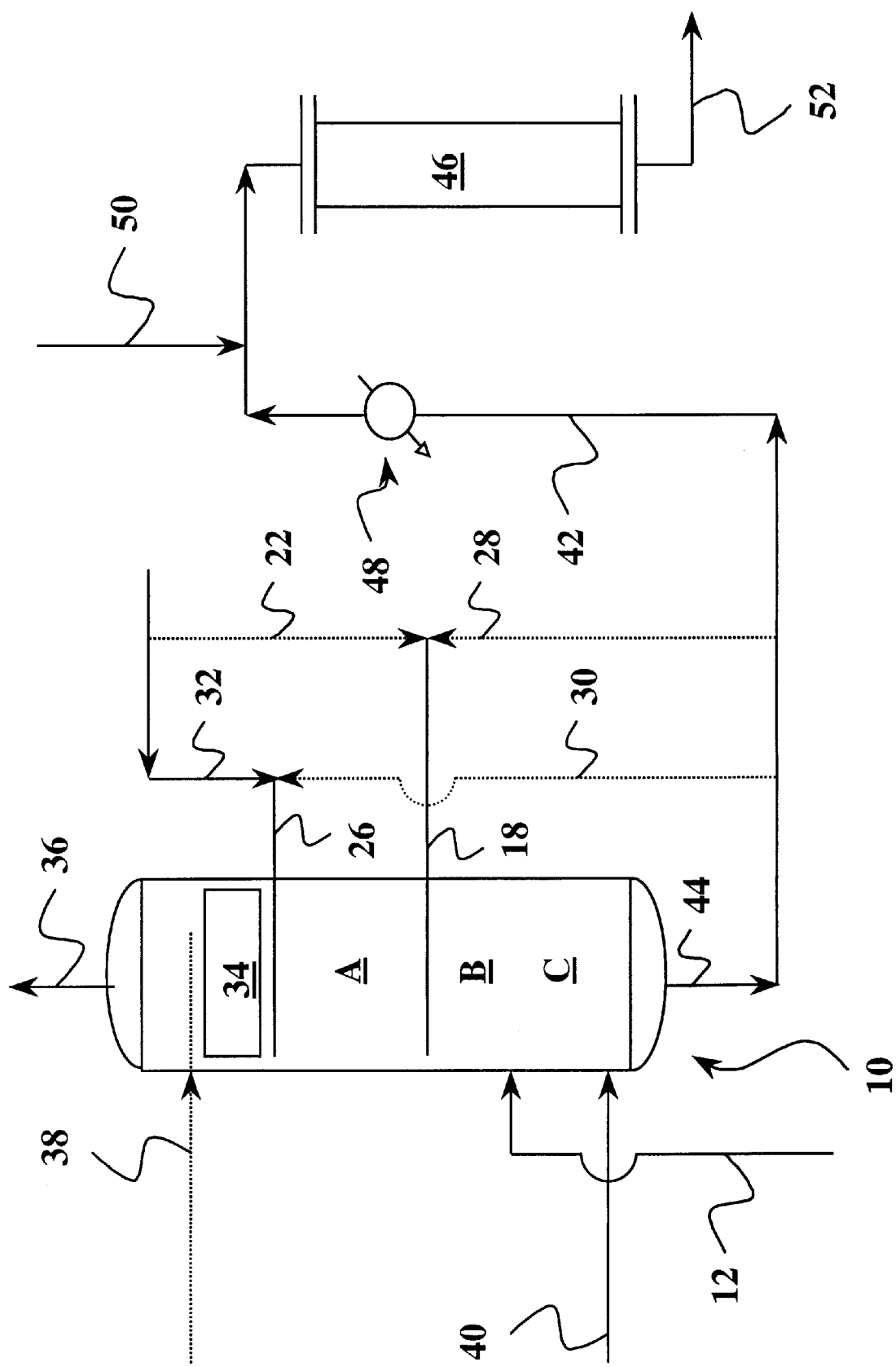

REMOVAL OF SULFUR COMPOUNDS FROM GASEOUS WASTE STREAMS

FIELD OF THE INVENTION

The present invention relates to a novel process for the removal of gaseous sulfur compounds such as sulfur oxides and hydrogen sulfide from waste gas streams. The process comprises quenching and adsorption steps, which are carried out in a single scrubber vessel, followed by a fixed bed oxidation step. The sulfur is retained in a liquid stream requiring little or no further treatment to reduce its chemical oxygen demand prior to disposal.

BACKGROUND OF THE INVENTION

The emission of sulfur compounds must be carefully controlled in light of federal regulations designed to curtail industrial pollution. Title 1 of the Clean Air Act Amendment of 1990, for example, continues the requirement that new facilities meet stringent criteria regarding the discharge of airborne sulfur compounds. In the case of a petroleum refinery sulfur recovery plant, which often comprises a Claus process coupled with an incinerator, the legally acceptable concentration of discharged gaseous sulfur dioxide is only 0.025% by volume. Besides Claus tail gas streams, another significant source of gaseous sulfur oxide emissions is sulfur containing fuel used in boilers, internal combustion engines, and heating units that produce contaminated stack and exhaust gas streams. Additionally, the smelting of sulfur-containing ores, coke refining, and sulfuric acid production all generate sulfur containing gaseous wastes.

Of significant commercial importance, then, are processes for the removal of sulfur compounds from such streams prior to their discharge. Typically, in the case of incinerator effluent streams, gaseous sulfur compounds are overwhelmingly in the form of sulfur oxides (e.g. sulfur dioxide and sulfur trioxide). Otherwise, hydrogen sulfide, carbonyl sulfide, carbon disulfide, and even elemental sulfur may also be present. To date, numerous processes have been developed to address the removal of these sulfur contaminants from waste gases. Perhaps most prevalent commercially is the use of a wet lime/limestone scrubbing agent to selectively extract sulfur compounds into an aqueous liquid as a mixture of sulfite and sulfate compounds of calcium.

Alternatively, a caustic scrubbing solution may be used to convert gaseous sulfur compounds into soluble sulfite and sulfate compounds. For example, if a sodium hydroxide scrubbing solution is used, the sulfur compounds will be sequestered in the liquid phase predominantly as sodium sulfite and sodium sulfate. In order to eventually dispose of such a liquid, however, it is important to limit the quantity of sulfite anion because sulfite will normally convert to sulfate and, in the process, deprive the effluent stream of biologically needed dissolved oxygen. Thus, it has been an ongoing objective in industry to not only remove sulfur contaminants from gas streams, but also to allow the disposal of liquid products resulting from this removal. These liquid products must therefore have sufficiently low chemical oxygen demand (COD) and biological oxygen demand (BOD).

To this end, several prior art references have focused on gaseous sulfur contaminant removal through a combination of adsorption and oxidation. For example, in U.S. Pat. No. 3,914,387, $SO_2$ in a dust-containing waste gas (e.g. effluent from metallurgical operations) is removed via contact with a liquid $NaOH/Na_2SO_4$ solution. The formation of sulfates, rather than sulfites, is highly favored due to the presence of Fe, Co, Ni, Mn, and/or V in the dust particles in quantities effective to catalyze the oxidation of sulfites in the presence of oxygen. However, although it is convenient to use gas-entrained metals for the necessary oxidation, uncertainties related to the quantities of such metals can make operation problematic. For example, metal addition to the gas stream or scrubber solution may be required if insufficient quantities for sulfite oxidation are inherently present. Alternatively, an excessive amount of metal-containing dust may present solubility problems and require means for filtration of the scrubber solution.

In a similar manner, U.S. Pat. No. 3,920,794 recognizes the utility of NaOH and $Na_2CO_3$ scrubbing solutions for removing $SO_2$ from gas streams. After the adsorption or scrubbing step, an oxidation is performed to convert sulfites to sulfates. This oxidation is carried out by the addition of catalytically effective metals (e.g. Fe, Cu, Co, Mn, and/or Ni) to the adsorption solution in the form of sulfate, phosphate, or chloride salts. Such salts are known to be soluble in sufficient quantities to catalyze the sulfite oxidation reaction. In this disclosure, it is noted that a secondary oxidation step may be required if the level of sulfites in the scrubbing solution after adsorption of $SO_2$ is excessive, even with the addition of catalytic metals. Furthermore, the metal salts must be continually added to the scrubbing solution to replenish quantities lost through the disposal of spent liquid effluent.

In U.S. Pat. No. 4,156,712, the absorption and oxidation are combined in a single vessel through the simultaneous introduction of oxygen-containing gas into a lower portion of an aqueous liquid adsorption solution and the $SO_2$ contaminated gas into an upper portion. If the adsorbent is $Ca(OH)_2$ or $CaCO_3$, the sulfur impurities, in the oxidizing environment contemplated in this case, can be precipitated as sulfates. Unfortunately, a sufficient mass transfer rate of oxygen into the liquid phase is difficult without mechanical agitation. Also, the liquid adsorbent sulfate level is constrained to a small amount (less than 1%) to maintain a thermodynamically favorable environment for continual sulfate formation; otherwise, it is taught that an oxidation catalyst in the form of $Fe^{+3}$ ions should be added. Other considerations associated with such a single-stage non-catalytic oxidative adsorption include the significant vaporization or even entrainment of adsorption solution caused by the large air flow requirement. Lastly, the temperature of the contaminated feed gas should be maintained considerably lower than a typical incinerator gas stream effluent, with 40–70° C. being preferred.

In U.S. Pat. No. 4,307,069, flue gas containing $SO_2$ is purified while the sulfur content is recovered in elemental form. The process is carried out through a sequence of steps, the first two of which are adsorption and oxidation. Adsorption is achieved with a scrubbing solution of $NaAlO_2$ and NaOH to form a suspension, after contact with $SO_2$, that is a mixture of sodium and aluminum sulfates and sulfites. To drive the oxidation of existing sulfites to sulfates, it is taught to add preferably ferric and ferrous sulfates to the suspension in the presence of oxygen. It is unlikely that these iron containing compounds can be easily recovered in a usable form, given that the suspension wherein they are dissolved is thereafter subjected to a reduction step in the presence of coal and air at 1000° C.

Finally, in U.S. Pat. No. 4,452,766, another multi-stage process for the removal of $SO_2$ from waste gas is described. Under circumstances where the gas stream is derived from a coal fired plant and contains fine particles of alkaline ash, effective adsorption can be attained without the continual addition of alkali or other scrubbing agent. Included in the overall method is an oxidation step wherein alkali bisulfite, the reaction product of adsorbed $SO_2$ and alkali metal impurities in the gas feed stream, is converted to the sulfate form. This is achieved to some extent using the small amounts of oxygen contained in the flue gas that are dissolved in the scrubbing solution. However, the disclosure indicates that, for complete oxidation, it may be necessary to increase the amount of air in the boiler or furnace from which the waste gas is derived. In effect, a greater air flow to the adsorption medium to cause the oxidation invariably either increases solution losses through vaporization or results in higher energy requirements associated with liquid recovery.

In contrast to the aforementioned references, the present invention provides a method for the removal of $SO_2$ and various other sulfur containing compounds in waste gas streams, whereby an oxidation step using a fixed bed of catalyst is performed. The oxidation provides an effluent liquid containing only small amounts of sulfites; thus, this effluent has only minimal biological and chemical oxygen demands and may, in a preferred case, be directly disposed of in an environmentally sound manner. Because the oxidation catalyst is maintained as a solid phase, losses of valuable catalytic metals are minimized. Furthermore, the oxidation reaction is effective enough so that essentially complete oxidation is achieved without the need for oxygen beyond that which is soluble in the liquid. An additional advantage of the present invention, aside from greatly reduced or eliminated solution and catalyst losses, is the ability of the novel scrubber vessel design to handle waste gas streams with elevated temperatures, characteristic of incinerator effluents. Lastly, the fabrication costs of equipment associated with this gas treatment method are relatively low, since both the required adsorption vessel and oxidation reactor are simple designs. Overall, therefore, the method of the present invention overcomes many of the limitations that the prior art has failed to address.

SUMMARY OF THE INVENTION

In one embodiment, the present invention is a process for treating a gas stream containing a sulfur compound, where the process comprises passing the gas stream through a gas inlet into a lower portion of a scrubber comprising a vertically oriented vessel, contacting the gas stream with a downwardly flowing quench liquid in a quench zone to yield a quenched gas stream and a quench effluent, contacting the quenched gas stream with a downwardly flowing liquid adsorbent in an adsorption zone at adsorption conditions to yield a treated gas stream and an adsorption effluent, combining the quench effluent and the adsorption effluent in a liquid collection zone to yield a bottoms liquid product, withdrawing the bottoms liquid product from the vessel through a liquid outlet, contacting a first portion of the bottoms liquid product with an oxidizing agent and a solid catalyst at oxidation conditions to yield a treated liquid, withdrawing the treated gas stream from an upper portion of the vessel through a gas outlet, and adding water to the vessel through a water inlet.

In a more specific embodiment, the present invention is a process for treating a gas stream containing sulfur dioxide, where the process comprises passing the gas stream through a gas inlet into a lower portion of a scrubber comprising a vertically oriented vessel, contacting the gas stream with a downwardly flowing quench liquid in a quench zone to yield a quenched gas stream and a quench effluent, contacting the quenched gas stream with a downwardly flowing liquid adsorbent comprising a basic solution in an adsorption zone at adsorption conditions to yield a treated gas stream and an adsorption effluent containing a dissolved sulfite compound, combining the quench effluent and the adsorption effluent in a liquid collection zone to yield a bottoms liquid product, withdrawing the bottoms liquid product from the vessel through a liquid outlet, contacting a first portion of the bottoms liquid product with air and a solid catalyst comprising a solid carrier having a metal phthalocyanine compound deposited thereon, the liquid/solid contacting carried out at oxidation conditions to yield a treated liquid containing a dissolved sulfate compound, recycling a second portion of the bottoms liquid product through a quench zone inlet into the vessel at the top of the quench zone, recycling a third portion of the bottoms liquid product through an adsorption zone inlet into the vessel at the top of the adsorption zone, withdrawing the treated gas stream from the vessel through a gas outlet, and adding water to the vessel through a water inlet extending into the liquid collection zone.

BRIEF DESCRIPTION OF THE DRAWING

The drawing is a simplified flow diagram representing several possible embodiments of the present invention. This drawing is intended only to be schematically illustrative of the present invention and is not to be a limitation thereof.

DETAILED DESCRIPTION OF THE INVENTION

The feed stream to the present invention is broadly any gas stream containing a sulfur compound impurity. Of significant potential applicability are effluent gases from oil refinery operations, flue or stack gases from electrical power generating stations where fossil fuels are burned, waste gas from sulfuric acid manufacturing plants, and gaseous discharge streams from metal ore smelting. In many cases, gas phase byproducts containing various sulfur contaminants such as $H_2S$, COS, $SO_2$, $SO_3$, $CS_2$, and elemental sulfur vapor are oxidized in an incinerator so that the sulfur species are converted predominantly to $SO_2$. These types of incinerator off gases are particularly relevant to the process of the present invention, especially in cases where local, state, or national environmental legislation prohibits the venting of such $SO_2$ contaminated wastes into the atmosphere. The method is effective for waste streams having a wide-ranging value of total sulfur, usually from about 50 to about 10000 ppm by volume.

Since gases exiting an incinerator that is designed to convert sulfur species to $SO_2$ are typically heated to about 400–700° C., a means for cooling these streams prior to adsorption in a liquid adsorbent or aqueous scrubbing medium is necessary. The present invention combines a cooling or quench zone with adsorption zone in the same adsorption vessel, so that a separate heat transfer operation prior to adsorption is unnecessary. In fact, the same scrubbing medium used as a liquid adsorbent for the adsorption is also used as a quench medium. After cooling, the gas stream temperature is preferably reduced to a value from about 30° C. to about 150° C., which corresponds to the preferred range for subsequent adsorption zone conditions.

Emanating from an inlet pipe at the top of the quench zone, the quench medium is contacted with upwardly flowing gas to provide cooling. Preferably, the quench zone inlet pipe extends transversely across the diameter of the vessel and has a plurality of perforations to distribute or spray the liquid adsorbent uniformly about the quench zone cross section. This configuration allows rapid cooling through contact of the feed gas with finely divided droplets of quench medium. In an alternate embodiment, the gas stream may be injected directly into the liquid collection zone, located below the quench zone, where a standing level of combined quench medium and liquid adsorbent effluent liquids is maintained at the bottom of the adsorption vessel. This combined liquid is hereafter referred to as the bottoms liquid product.

The quench medium and liquid adsorbent may be any liquids known to adsorb gaseous sulfur compounds such as $SO_2$ and include basic aqueous solutions of alkali or alkaline earth metal hydroxides; particularly, sodium hydroxide and potassium hydroxide solutions are favorable due to their low cost and ready availability. Ammonium hydroxide is also suitable. Concentrations of such basic hydroxide solutions preferably range from about 5% to about 15% of hydroxide compound or base per weight of total solution.

After passing through the quench zone, the feed gas flows upward into an adsorption zone where it is contacted with a counter-current flow of liquid adsorbent. Preferred conditions for adsorption, in addition to the above mentioned temperature range, include an absolute pressure from about 0.5 to about 5 atmospheres and a molar ratio of gaseous sulfur to base (e.g. sodium hydroxide) from about 1:1 to about 1:10. To ensure efficient contacting of the liquid adsorbent and gas, the adsorption zone may comprise either a packed or trayed section within the vessel. Appropriate packing materials are well known in the art and include glass, ceramic, metal, plastic, or silica pieces in the shape of rachig rings, saddles, beads, helicies, disks, cones, and the like. The suitability of the packing material for a given application must, of course, be evaluated. For instance, most stainless steel packing materials are known to be essentially corrosion resistant when subjected to continual contact with basic solutions in the environment of the adsorption vessel. Trayed sections, which are generally appropriate for larger diameter columns, may also be of various designs known in the art. The liquid adsorbent used in the adsorption zone enters from above the packed or trayed section.

Similar to the quench zone inlet pipe configuration, the adsorption zone inlet pipe preferably extends transversely across the diameter of the vessel and has a plurality of perforations to distribute or spray the liquid adsorbent uniformly about the adsorption zone cross section. Overall, the lengths of the quench and adsorbent zones are usually from about 5 to about 50 percent and from about 30 to about 90 percent, respectively, of the length of the vessel. The liquid effluent streams from the quench and adsorption zones are combined in a liquid collection zone, comprising a level of bottoms liquid product that is maintained in the lower portion of the adsorption vessel below the quench zone.

The bottoms liquid product in the liquid collection zone contains quantities of sulfur adsorbed from the feed gas. In general, when $SO_2$ is absorbed in a basic solution, the sulfur is contained in the liquid as a mixture of predominantly sulfite with some bisulfite compounds. For example, the scrubbing of gaseous $SO_2$ with NaOH yields dissolved sulfur compounds mostly in the form of $NaSO_3$, but comprising at least some $NaHSO_3$. Other gaseous sulfur compounds such as $H_2S$, COS, $CS_2$, and $SO_3$, are also converted to dissolved sulfites and bisulfites, with the possible formation of sulfates, thiosulfates, sulfides, and bisulfides. With the exception of sulfates, all of these dissolved sulfur containing species are only incompletely (i.e. partially) oxidized and can thus undergo spontaneous reaction with oxygen to yield completely oxidized products (e.g. sulfates and bisulfates). Elemental sulfur, which may be present in trace quantities in the feed gas stream, is also absorbed to some extent in the liquid adsorbent. However, this contaminant is generally not converted at adsorption conditions to a partially or completely oxidized sulfur compound.

For continuous adsorption operation, it is necessary to withdraw a stream of bottoms liquid product from the liquid collection zone. To replace this liquid, a stream of fresh scrubbing medium is introduced to the adsorption vessel through the adsorption zone inlet as fresh liquid adsorbent and through the quench zone inlet as fresh quench medium. Also, water is added to the vessel through a water inlet to offset the amount exiting with the treated gas stream as water vapor and possibly as entrained droplets of scrubbing medium. Minimization of liquid entrainment into the gas stream is normally accomplished by placing a demisting pad in the upper portion of the vessel above the adsorption zone. Of course, any high surface area element known in the art to retain entrained liquid is an applicable substitute for a demisting pad. Water is generally introduced continuously into the lower portion of the vessel through a separate inlet pipe, preferably extending into the quench zone in order to cool the bottoms liquid product, which may become heated due to heat exchange with hot feed gas. Another optional but potentially beneficial procedure is continuous or intermittent introduction of water directly above the demisting pad or other suitable entrainment reduction element to free it of solid residues, particularly accumulated salts from the scrubbing medium.

In a preferred embodiment of the process of the present invention, the adsorbed sulfur is removed in a first portion of the bottoms liquid product, while second and third portions of this liquid are recycled to the quench zone and adsorption zone inlets, respectively. The second and third portions of the bottoms liquid product can therefore be combined with fresh scrubbing solution before introduction into the quench and adsorption zones. When this recycle mode of operation is practiced, however, it is generally preferred to add fresh scrubbing solution only to the adsorption zone inlet as liquid adsorbent while using recycle liquid alone as a quench medium. The treated gas stream exiting the adsorption zone is eventually withdrawn from an upper portion of the adsorption vessel through a gas outlet. Preferably, the treated gas contains less than 10 ppm by volume of total sulfur compounds, thus rendering it in compliance with environmental regulations concerning gaseous sulfur emissions.

Regardless of whether at least some of the bottoms liquid product is recycled, this material generally cannot be removed from the liquid collection zone and subsequently released to the environment without further treatment. In the present invention, any bottoms liquid product that is removed from the vessel and not recycled is treated via oxidation to convert at least some of the partially oxidized sulfites, thiosulfates, and sulfides to corresponding completely oxidized sulfates and also to convert bisulfites to corresponding completely oxidized bisulfates. Such processing reduces the chemical oxygen demand of the waste stream, preferably to levels whereby discharge to the environment complies with local legislation. In the present invention, the oxidation of sulfur compounds dissolved in the bottoms liquid product is achieved by contacting it with an oxidizing agent and a solid catalyst at oxidation conditions in an oxidation reactor to yield a treated liquid. Preferably, the treated liquid will have a concentration of partially oxidized sulfur compounds of less than about 50% of that of the bottoms liquid product, which has the same composition as the feed stream to the oxidation reactor.

The preferred oxidizing agent for use in the oxidation step is oxygen gas, and, for convenience, air can be used by dissolving an effective amount in the bottoms liquid product exiting the absorption vessel and entering the oxidation reactor. By an effective amount of air is meant that the amount of oxygen contained therein is from about 50% to about 300% of the amount required to completely oxidize any partially oxidized dissolved sulfur containing species (which represent the bulk of the sulfur compounds) in the bottoms liquid product. In general, as the sulfur level in the liquid increases, the oxygen requirement also increases. Consequently, the pressure necessary to dissolve the oxygen, injected into the liquid reaction mixture as air, increases as well. Absolute oxidation reaction pressure can vary from about atmospheric pressure to about 30 atmospheres. Other oxidation conditions associated with the process of the present invention are a temperature from about 30° C. to about 100° C. and a catalyst liquid hourly space velocity from about 0.05 $hr^{-1}$ to about 5 $hr^{-1}$. As understood in the art, liquid hourly space velocity is the hourly volumetric liquid feed flow rate divided by the catalyst volume and represents the reciprocal of the average time of the reaction liquid within the fixed catalyst bed. As mentioned, the process is carried out in the presence of an oxidation catalyst contained in the oxidation reactor.

Suitable catalyst compositions preferably comprise a metal phthalocyanine deposited on a solid carrier where the metal is selected from the group consisting of cobalt, vanadium, nickel, iron, molybdenum, copper, magnesium, and mixtures thereof. Alternatively, a sulfonated derivative of the metal phthalocyanine (e.g. cobalt phthalocyanine sulfonate or cobalt phthalocyanine disulfonate) may also be used to immobilize the catalytically active metal. Sulfonated forms of phthalocyanine that are particularly useful in the oxidizing catalyst of the present invention include the mono-, di-, tri-, and tetrasulfonate forms. The solid carrier upon which the metal phthalocyanine or sulfonated metal phthalocyanine is supported is essentially inert in the oxidation reaction environment. Activated carbon, for example, is known to be a preferred carrier due to its excellent stability in contact with basic aqueous solutions such as the adsorption vessel bottoms liquid product. Other types of catalysts suitable for the oxidation reaction of the present invention are taught in detail in U.S. Pat. No. 2,988,500 and various improvements upon these formulations are also well known in the art. The oxidation reaction employs a fixed bed of catalyst particles preferably essentially spherical in shape, although other catalyst shapes are certainly possible.

In referring to the drawing, a gas stream containing sulfur compounds is introduced via line 12 into the lower portion of a vertically oriented adsorption vessel 10 at the bottom of the quench zone B and above or within the liquid collection zone C. The gas stream is contacted with a counter-current flow of downwardly flowing quench medium entering the vessel 10 at the top of the quench zone B through a quench zone inlet 18. Liquid flowing to the quench zone inlet 18 may comprise either a second portion of bottoms liquid product that is recycled via line 28, a portion of a fresh quench medium added via line 22, or both. Preferably, the quench zone inlet 18 extends transversely across the diameter of the vessel 10 and defines a plurality of perforations (not shown) to distribute the quench medium uniformly across the quench zone B cross section.

After the upwardly flowing gas is quenched to preferably from about 30° C. to about 150° C., it is passed to an adsorption zone A where it is contacted with a downwardly flowing liquid adsorbent entering the vessel 10 through an adsorption zone inlet 26. Similar to the quench medium, liquid adsorbent entering the adsorption zone inlet 26 may comprise either a third portion of the bottoms liquid product that is recycled via line 30, a portion of fresh liquid adsorbent added via line 32, or both. Also, similar to the quench zone inlet 18, the adsorption zone inlet 26 preferably extends transversely across the diameter of the vessel 10 and defines a plurality of perforations (not shown) to distribute the adsorption liquid uniformly across the adsorption zone A cross section. The adsorption zone A comprises a suitable packing material or trays (not shown) designed to provide intimate mixing of the quenched gas and adsorption liquid.

After adsorption, the gas rises further where it contacts a demisting pad 34 or other element designed to reduce liquid entrainment. Eventually, the gas, which has been depleted in sulfur contaminants after adsorption to preferably a concentration of less than about 10 ppm by volume, is withdrawn through a gas outlet 36 from the vessel 10 upper portion.

Water is added to the vessel 10 to replace amounts lost through liquid entrainment into the treated gas stream exiting through the gas outlet 36. Usually, the water is added continuously directly into the liquid collection zone C through a lower water injection pipe 40, although it is certainly also possible to add water into other locations within the vessel, for example into the quench zone B. The lower water injection pipe 40 serves not only to replace fluid lost through vaporization or entrainment into the upwardly flowing gas stream but also to cool the liquid in the liquid collection zone C which normally absorbs heat from the gas stream. In an optional embodiment of the present invention, water may also be added either continuously or intermittently above the demisting pad 34 through an upper water injection pipe 38. The upper water injection pipe 38 primarily provides a means for cleaning the demisting pad 34 of water soluble residues, particularly accumulated salts deposited from the scrubbing solution.

In a preferred embodiment of the present invention, second and third portions of the bottoms liquid product are recycled via line 28 to the quench zone inlet 18 and via line 30 to the adsorption zone inlet 26, respectively. This recycle mode of operation generally allows for judicious use of scrubbing solution while providing sufficient liquid flow through the adsorption vessel 10 to effect good gas/liquid contacting and distribution. Whether or not recycle is practiced, it is preferred to maintain a bottoms liquid product concentration of scrubbing solution base (after adsorption of sulfur compounds) from about 2% to about 10% by weight. Higher concentrations usually indicate that the scrubbing solution is not utilized optimally. As mentioned previously, the starting or fresh concentration (before adsorption of sulfur compounds) of the scrubbing solution ranges from about 5% to about 15% of base by weight. Base concentrations of less than about 2% by weight in the bottoms liquid product may indicate that the adsorption of sulfur compounds is incomplete. As is known in the art, the steady state concentration of the bottoms liquid product stream (and hence that of the recycle streams if the recycle mode is used) can be readily determined from the fresh scrubbing solution concentration and flow rate, the recycle liquid flow rate, the feed gas stream flow rate and sulfur compound concentration therein, and the withdrawal rate of bottoms liquid product.

Regardless of whether the adsorption is a once through or recycle operation, to prevent excessive accumulation of sulfur compounds in the bottoms liquid product, at least a portion thereof must be removed from the adsorption vessel 10 and not recycled. Therefore, while the entire bottoms liquid product is withdrawn from the vessel 10 through a liquid outlet 44, a first portion of this stream is routed via line 42 to an oxidation reactor 46. The oxidation step reduces the COD of the oxidation reactor effluent stream that is removed via line 52, preferably to less than about 50% of its original value, prior to disposal. In order to establish a desired temperature for oxidation, preferably about 30° C. to about 100° C., it may be necessary to cool the inlet liquid stream flowing to the oxidation reactor using a cooler 48 with cooling water or other medium flowing therethrough to provide adequate heat exchange. In the presence of oxidation catalyst (not shown) within the oxidation reactor 46, the inlet liquid is reacted with a sufficient amount of air, injected via line 50, or other oxygen containing gas in such a manner as to preferably render the reactor effluent within environmental COD specifications for waste disposal.

What is claimed is:

1. A process for treating a gas stream containing a sulfur compound, the process comprising:
   a) passing the gas stream through a gas inlet into a lower portion of a scrubber comprising a vertically oriented vessel;
   b) contacting the gas stream with a downwardly flowing quench medium introduced into the vessel through a quench zone inlet at the top of a quench zone to yield both an upwardly flowing quenched gas stream and a downwardly flowing quench effluent within the vessel;
   c) contacting the quenched gas stream with a downwardly flowing liquid adsorbent introduced into the vessel through an adsorption zone inlet at the top of an adsorption zone above the quench zone at adsorption conditions to yield both an upwardly flowing treated gas stream and a downwardly flowing adsorption effluent within the vessel;
   d) combining the quench effluent and the adsorption effluent in a liquid collection zone in the vessel below the quench zone to yield a bottoms liquid product within the vessel;
   e) withdrawing the bottoms liquid product from the vessel through a liquid outlet;
   f) contacting a first portion of the bottoms liquid product with an oxidizing agent and a solid catalyst at oxidation conditions to yield a treated liquid;
   g) withdrawing the treated gas stream from an upper portion of the vessel through a gas outlet; and
   h) adding water to the vessel through a water inlet.

2. The process of claim 1 further comprising, after step (f):
   a) recycling a second portion of the bottoms liquid product through the quench zone inlet into the vessel at the top of the quench zone; and
   b) recycling a third portion of the bottoms liquid product through the adsorption zone inlet into the vessel at the top of the adsorption zone.

3. The process of claim 2, further comprising, after step (b):
   a) adding continuously to the vessel through the adsorption zone inlet fresh liquid adsorbent.

4. The process of claim 1 where the water inlet extends into the liquid collection zone.

5. The process of claim 1 where the quench zone has a length from about 5% to about 50% of the length of the vessel.

6. The process of claim 1 where the adsorption zone has a length from about 30% to about 90% of the length of the vessel.

7. The process of claim 1 where the gas inlet extends to the liquid collection zone.

8. The process of claim 1 where the adsorption zone comprises a plurality of trays.

9. The process of claim 1 where the adsorption zone comprises packing material.

10. The process of claim 1 where the adsorption zone inlet is a pipe extending transversely across the diameter of the vessel and containing a plurality of perforations to distribute the liquid adsorbent uniformly across the adsorption zone cross section.

11. The process of claim 1 where the quench zone inlet extends transversely across the diameter of the vessel and contains a plurality of perforations to distribute the quench liquid uniformly across the quench zone cross section.

12. The process of claim 1 where the sulfur compound concentration is from about 50 to about 10000 ppm by volume.

13. The process of claim 1 where the sulfur compound is selected from the group consisting of sulfur dioxide, sulfur trioxide, hydrogen sulfide, carbonyl sulfide, carbon disulfide, and mixtures thereof.

14. The process of claim 1 where the gas stream is an incinerator effluent stream having a temperature from about 400° C. to about 700° C.

15. The process of claim 1 where the liquid adsorbent is a solution of a base selected from the group consisting of sodium hydroxide, potassium hydroxide, ammonium hydroxide, and mixtures thereof.

16. The process of claim 15 where the base concentration is from about 5% to about 15% base by weight.

17. The process of claim 15 where the bottoms liquid product concentration of base is from about 2% to about 10% by weight.

18. The process of claim 1 where the adsorption conditions include an absolute pressure from about 0.5 to about 5 atmospheres and a temperature from about 30° C. to about 150° C.

19. The process of claim 1 where the adsorption conditions include a molar ratio of sulfur compound to base from about 1:10 to about 1:1.

20. The process of claim 1 where the sulfur compound concentration of the treated gas is less than about 10 ppm by volume.

21. The process of claim 1 where the oxidizing agent comprises oxygen gas.

22. The process of claim 21 where oxygen gas is present in an amount from about 50% to about 300% of the amount required for complete oxidation of sulfur compounds present in the first portion of the bottoms liquid product.

23. The process of claim 1 where the solid catalyst comprises a solid carrier having a metal phthalocyanine compound deposited thereon.

24. The process of claim 23 where the solid carrier is activated carbon.

25. The process of claim 23 where the metal is selected from the group consisting of cobalt, vanadium, nickel, iron, molybdenum, copper, magnesium, and mixtures thereof.

26. The process of claim 23 where the phthalocyanine compound is selected from the group consisting of phthalocyanine, phthalocyanine sulfonate, phthalocyanine disulfonate, phthalocyanine trisulfonate, phthalocyanine tetrasulfonate, and mixtures thereof.

27. The process of claim 1 where the oxidation conditions include an absolute pressure from about 1 to about 30 atmospheres, a temperature from about 30° C. to about 100° C., and a liquid hourly space velocity from about 0.05 to about 5 $hr^{-1}$.

28. The process of claim 1 where the treated liquid has a concentration of partially oxidized sulfur compounds of less than about 50% of that of the first portion of the bottoms liquid product.

* * * * *